(12) United States Patent
Delport

(10) Patent No.: US 9,306,746 B2
(45) Date of Patent: Apr. 5, 2016

(54) RANDOMIZING CURRENT INJECTION CIRCUIT TO OBSCURE GATE NOISE FOR ADDED SECURITY

(71) Applicant: Microchip Technology Incorporated, Chandler, AZ (US)

(72) Inventor: Vivien Delport, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 23 days.

(21) Appl. No.: 14/207,902

(22) Filed: Mar. 13, 2014

(65) Prior Publication Data

US 2014/0270169 A1     Sep. 18, 2014

Related U.S. Application Data

(60) Provisional application No. 61/784,945, filed on Mar. 14, 2013.

(51) Int. Cl.
*H04L 29/06* (2006.01)
*H04L 9/14* (2006.01)
*H04L 9/00* (2006.01)

(52) U.S. Cl.
CPC *H04L 9/14* (2013.01); *H04L 9/003* (2013.01); *H04L 2209/12* (2013.01)

(58) Field of Classification Search
USPC ......................................................... 380/252
See application file for complete search history.

(56) References Cited

U.S. PATENT DOCUMENTS

| 4,905,204 | A  | * | 2/1990 | Hughes | 367/62 |
| 8,255,702 | B1 | * | 8/2012 | Pedersen | 713/189 |
| 8,595,274 | B2 | * | 11/2013 | Pradhan et al. | 708/250 |
| 2003/0185392 | A1 | | 10/2003 | Sun | 380/46 |
| 2004/0139363 | A1 | | 7/2004 | Elbe et al. | 713/400 |
| 2004/0205095 | A1 | * | 10/2004 | Gressel et al. | 708/253 |
| 2008/0189555 | A1 | | 8/2008 | Sohn | 713/192 |

OTHER PUBLICATIONS https://www.google.com/url?paf=&q=http://downloads.hindawi.com/journals/ijrc/2009/501672.pdf&usg=AFQjCNHFach8gh4GL92eb7ofT_DVGAjSsg|Analysis and Enhancement of Random Number Generator in FPGA Based on Oscillator Rings|Wold et al.|2009|pp. 1-9.*
Gurkaynak, Frank et al., "Improving DPA Security by Using Globally-Asynchronous Locally-Synchronous Systems," Solid-State Circuits Conference, Proceedings of the 31$^{st}$ European IEEE, 4 pages, 2005.
International Search Report and Written Opinion, Application No. PCT/US2014/025435, 9 pages, Jul. 14, 2014.

* cited by examiner

*Primary Examiner* — Mahfuzur Rahman
(74) *Attorney, Agent, or Firm* — Slayden Grubert Beard PLLC

(57) ABSTRACT

A circuit for obscuring gate switching noise includes a synchronous clock source; an asynchronous clock source; at least one current source; and a random number generating circuit for receiving clock inputs from the synchronous clock source and the asynchronous clock source, the random number generating circuit generating randomly changing asynchronous digital control signals for controlling the current source.

20 Claims, 5 Drawing Sheets

RANDOMIZING CURRENT INJECTION CIRCUIT TO OBSCURE GATE NOISE FOR ADDED SECURITY

CROSS REFERENCE TO RELATED APPLICATIONS

This application claims priority from commonly-assigned U.S. Provisional Patent Application Ser. No. 61/784,945 filed Mar. 14, 2013, which is hereby incorporated by reference in its entirety as if fully set forth herein.

TECHNICAL FIELD

The present disclosure relates to security applications for integrated circuits and, particularly, to systems and methods for preventing monitoring activities.

BACKGROUND

Processors and other devices implementing encryption systems are often provided with code-protected internal memories to store one or more encryption keys.

In many security application systems today, various attack methods are being used to reveal confidential information stored within code-protected internal memories of devices. These can include mathematical attacks, invasive physical attacks, and non-invasive physical attacks.

One method of non-invasive physical attack is known as "differential power analysis" (DPA). DPA monitors the current consumption or noise emission signatures of synchronous designs to determine what data is being manipulated, thus revealing confidential information.

For example, FIG. 1 illustrates various power consumption traces of an exemplary encryption module. FIG. 1a illustrates power supply current from trigger point to sending. FIG. 1b illustrates power supply current during programming. FIG. 1c illustrates power supply current during encryption, and FIG. 1d illustrates the end of encryption. From such power consumption traces, a DPA may be used to determine, for example, software keys and other encrypted information. In particular, DPA gathers a large number of samples from such traces by repeating encryption over a large number of cycles. The samples are compared and a statistical analysis is performed to determine similarities to identify the encryption key.

DPA is known to be sensitive to signal-to-noise ratios of monitored systems. Accordingly, techniques are known for introducing noise into such systems to prevent DPA. However, such techniques typically use randomly generated signals derived from a single synchronous clock source. Consequently, a DPA statistical analysis may overcome such approaches.

SUMMARY

These and other drawbacks in the prior art are overcome in large part by a system and method according to embodiments of the present invention.

Embodiments include an asynchronously controlled current noise generator that randomly generates minor current changes inside a microcontroller to obscure or hide any gate switching noise within the device for additional security protection. The circuit helps to change the current and/or emission characteristics profile of the device to help protect against external switching monitoring activities within the device.

A circuit for obscuring gate switching noise in accordance with embodiments includes a synchronous clock source; an asynchronous clock source; at least one current source; and a random number generating circuit for receiving clock inputs from the synchronous clock source and the asynchronous clock source, the random number generating circuit generating randomly changing asynchronous digital control signals for controlling the current source.

In some embodiments, the synchronous clock source comprises a system clock. In some embodiments, the at least one current source comprising a plurality of current sources. In some embodiments, the circuit includes a bitstream buffer for receiving an output of the random number generating circuit and controlling an amplitude of current from the plurality of current sources, wherein the plurality of current sources tap from different bit offsets in the bistream buffer. In some embodiments, the synchronous clock source includes an external clock source. In some embodiments, the asynchronous clock source comprising an internal clock source.

A method for providing a circuit for obscuring gate switching noise in accordance with embodiments includes providing a synchronous clock source; providing an asynchronous clock source; providing at least one current source; and providing a random number generating circuit for receiving clock inputs from the synchronous clock source and the asynchronous clock source, the random number generating circuit generating randomly changing asynchronous digital control signals for controlling the current source.

In some embodiments, the synchronous clock sources comprises a system clock. In some embodiments, the at least one current source comprising a plurality of current sources. In some embodiments, the circuit includes a bitstream buffer for receiving an output of the random number generating circuit and controlling an amplitude of current from the plurality of current sources, wherein the plurality of current sources tap from different bit offsets in the bitstream buffer. In some embodiments, the synchronous clock source includes an external clock source. In some embodiments, the asynchronous clock source comprising an internal clock source.

An integrated circuit in accordance with embodiments includes an encryption processor; and a circuit for obscuring gate switching noise, including: a synchronous clock source; an asynchronous clock source; at least one current source; and a random number generating circuit for receiving clock inputs from the synchronous clock source and the asynchronous clock source, the random number generating circuit generating randomly changing asynchronous digital control signals for controlling the current source.

In some embodiments, the synchronous clock sources comprises a system clock. In some embodiments, the at least one current source comprising a plurality of current sources. In some embodiments, the circuit includes a bitstream buffer for receiving an output of the random number generating circuit and controlling an amplitude of current from the plurality of current sources, wherein the plurality of current sources tap from different bit offsets in the bitstream buffer. In some embodiments, the synchronous clock source includes an external clock source. In some embodiments, the asynchronous clock source comprising an internal clock source. In some embodiments, the encryption processor comprising a code hopping encryption processor.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

As will be discussed in greater detail below, embodiments provide for a microcontroller with an embedded noise source to protect the security of information stored and/or used within the device. Traditional designs use randomly generated switching signals derived from a single synchronous system clock and do not implement multiple constant current mirrors with different amplitudes.

Figure 1A:
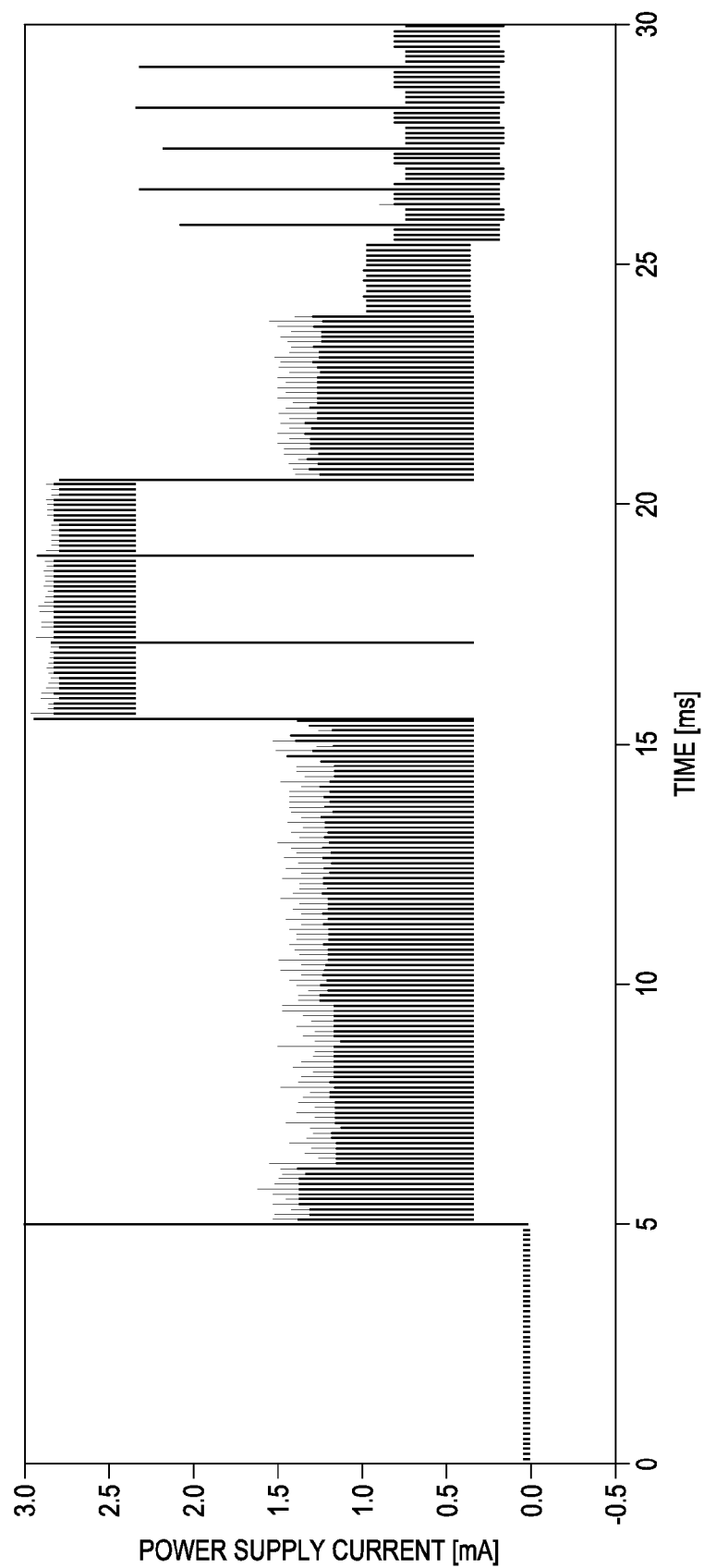
FIG. 1A-FIG. 1D illustrate exemplary power consumption traces.
Figure 1B:
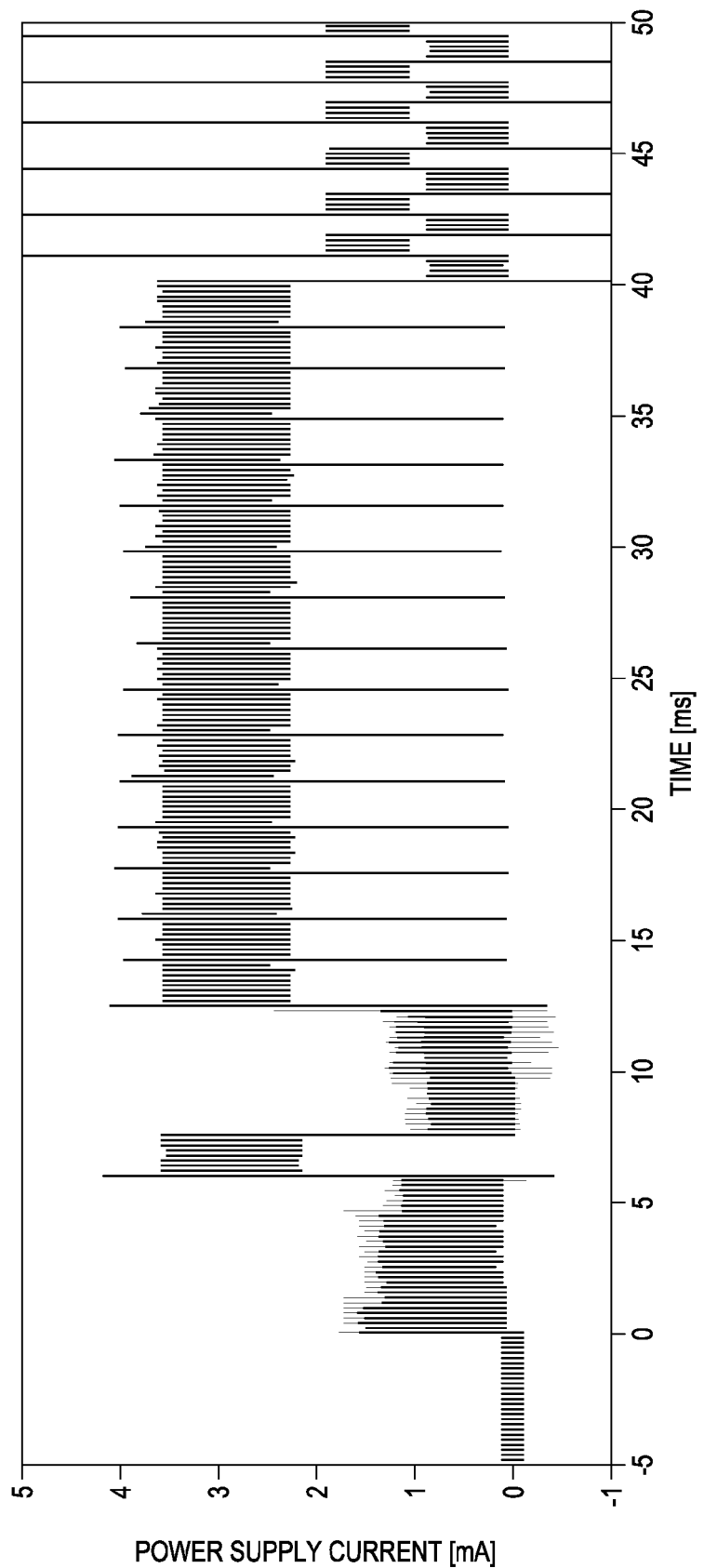
Figure 1C:
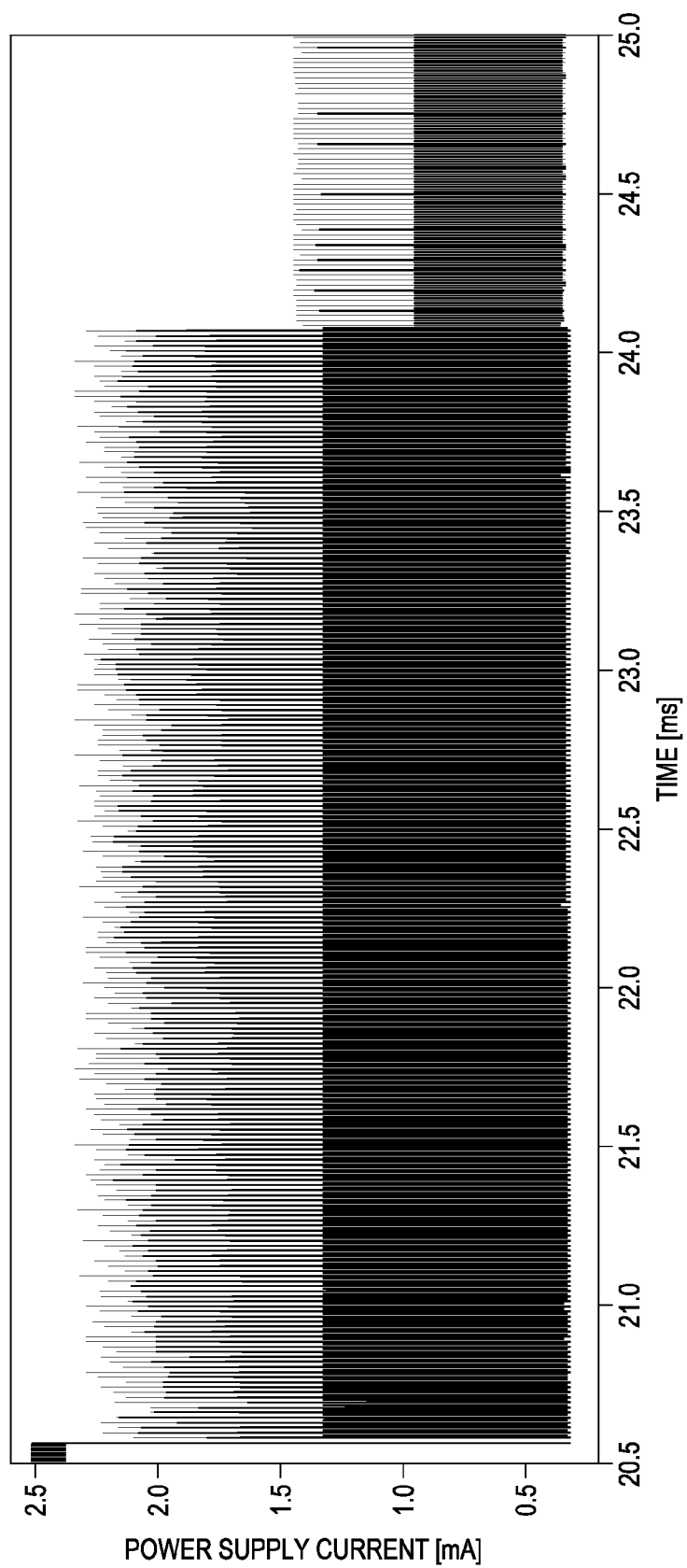
Figure 1D:
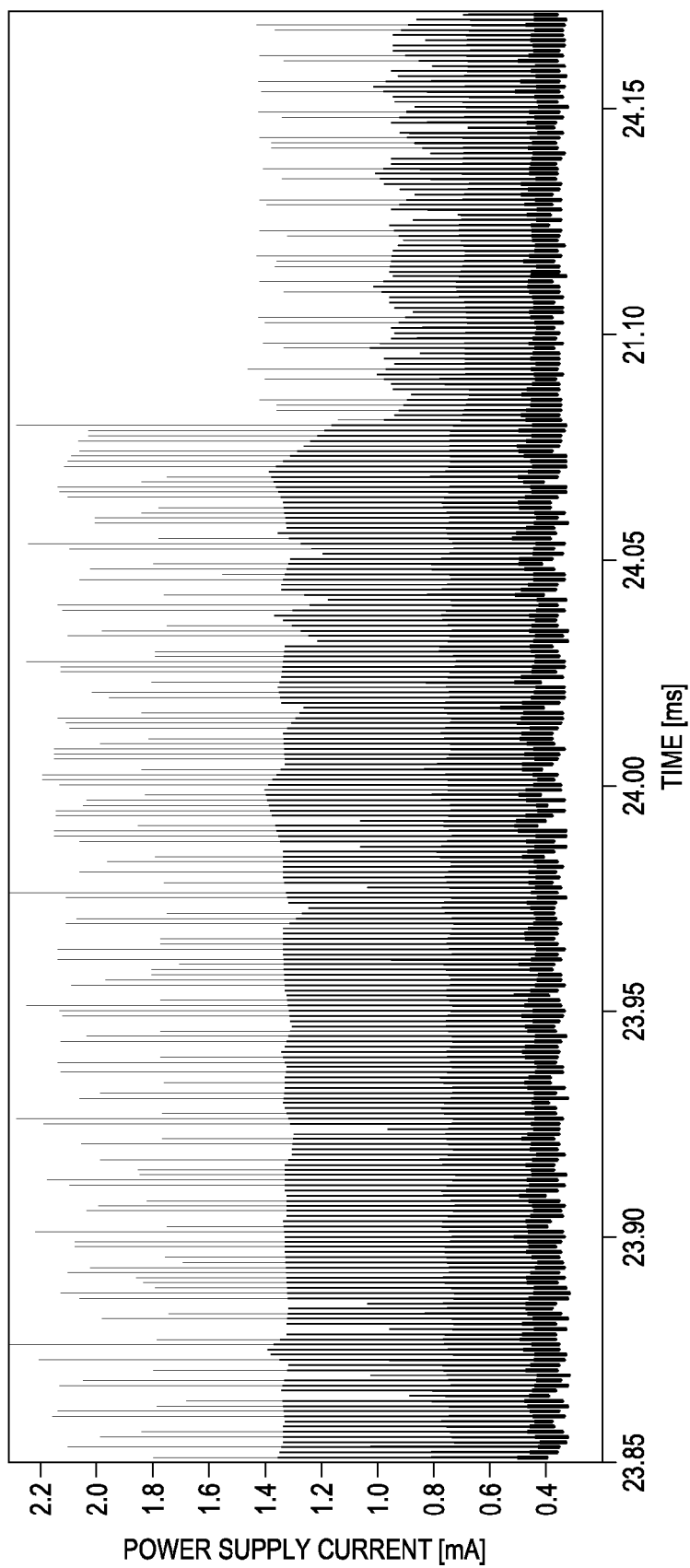
Figure 2:
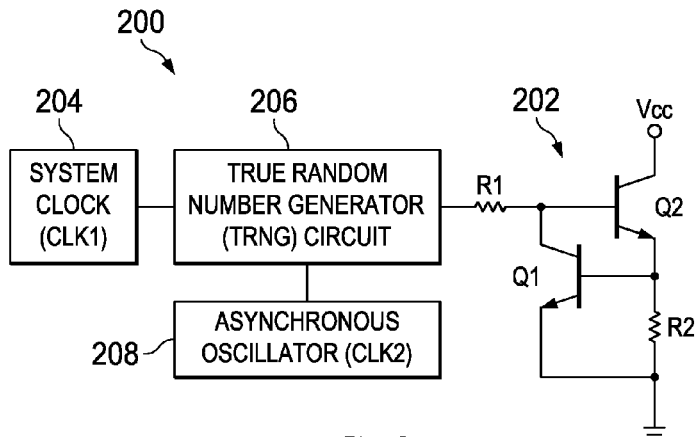
FIG. 2 is an exemplary circuit for randomizing current injection.

Turning now to FIG. 2, a diagram of an exemplary randomizing circuit according to embodiments is shown and identified by the reference numeral 200. In the embodiment illustrated, the circuit 200 includes at least one current source 202, multiple clock sources 204 (CLK1), 208 (CLK2), and a true random number generator (TRNG) circuit 206.

In the embodiment illustrated, CLK1 204 is a synchronous clock, such as the system clock, while CLK2 208 is asynchronous. TRNG 206 receives the clock signals to create a randomly changing asynchronous digital control signal that controls the one or more constant current sources 202. In some embodiments, the system clock 204 is from an external source, while the asynchronous clock 208 is internal.

In the embodiment illustrated, an exemplary constant current source 202 includes transistors Q1, Q2 and resistors R1, R2. The current limit may be set by sizing resistor R2. The amplitude of the generator noise signals can be varied by the addition of a bit stream buffer.

Figure 3:
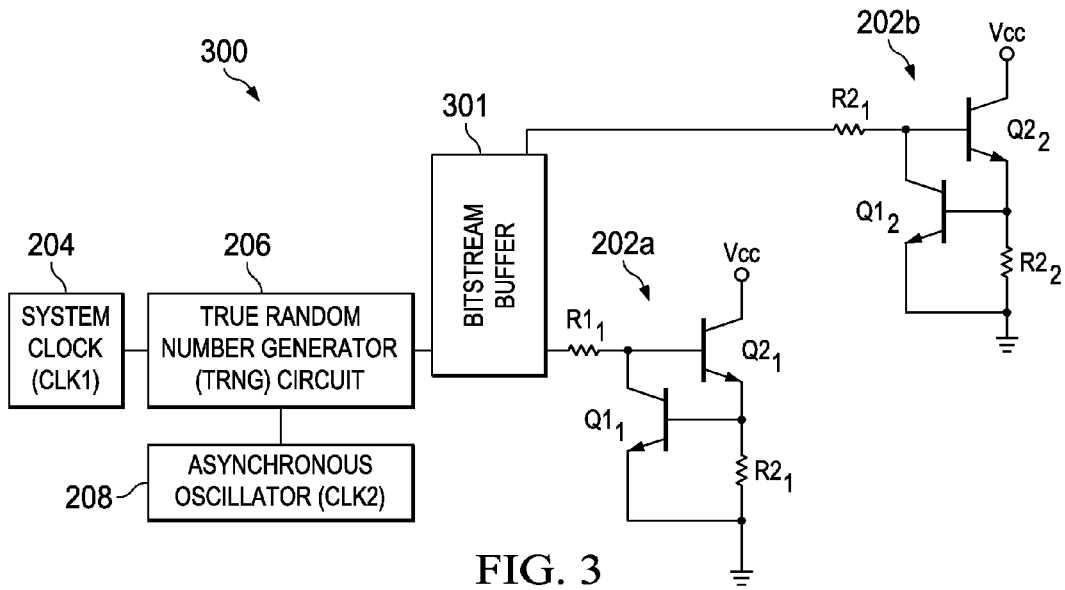
FIG. 3 is an exemplary circuit for randomizing current injection.

Another embodiment of a randomizing circuit 300 in accordance with embodiments is shown in FIG. 3. As shown, the randomizing circuit 300 includes system clock 204, TRNG circuit 206 and asynchronous oscillator 208. In addition, a bitstream buffer 301 is provided to buffer the outputs of the TRNG circuit 206, which can then be provided to one or more current mirror circuits 202a, 202b. In some embodiments, each of the current mirrors may receive a different bit offset from the bitstream buffer 301. For example, mirror 202a may receive an offset from bit 0 while mirror 202b may receive an offset from bit 3 (not shown).

Current mirror circuit 202a includes transistors $Q1_1$, $Q2_1$ and resistors $R1_1$ and $R2_1$. Again, the current limit may be set by sizing resistor $R1_1$. Current mirror 202b is similar, and includes transistors $Q1_2$, $Q2_2$ and resistors $R1_2$ and $R2_2$. Current limit size may be set by sizing the resistor $R2_1$.

It is noted that, depending on the particular implementation, more than two current mirrors could be provided, with current limit resistors chosen as desired. Thus, the figures are exemplary only.

Figure 4:
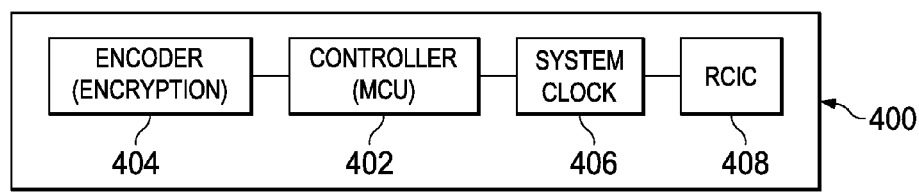
FIG. 4 is a processor including randomized current injection.

Turning now to FIG. 4, a cryptographic integrated circuit 400 is shown that may be used in conjunction with a randomizing current injection circuit in accordance with embodiments. In particular, the cryptographic integrated circuit 400 is representative of an encryption device. A code hopping device, such as a Keeloq code device is one embodiment. The cryptographic integrated circuit 400 includes a controller 402, such as a microcontroller (MCU) which may include or be in communication with an encryption coder/decoder 404. The encoder/decoder 404 may, for example, use one or more public or private keys to encode and decode a bitstream received from external to the cryptographic integrated circuit 400.

In addition, the cryptographic integrated circuit device 400 may include a system clock 406 and a randomizing current injection circuit 408 in accordance with embodiments. While encryption and decryption may occur using the system clock 406, the randomizing current injection circuit 408 generates a random current to obscure current traces from such activities.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A circuit for obscuring gate switching noise, comprising:
a synchronous clock source;
an asynchronous clock source;
a plurality of current sources;
a random number generating circuit receiving clock inputs from the synchronous clock source and the asynchronous clock source, the random number generating circuit generating randomly changing asynchronous digital control signals, and
a bitstream buffer receiving the asynchronous digital control signals and controlling an amplitude of current from the plurality of current sources, wherein the bitstream buffer comprises an input and a plurality of outputs, wherein each output has a predefined offset with respect to a stored bitstream and wherein each current source is coupled with a different one of said plurality of outputs.

2. A circuit in accordance with claim 1, wherein the synchronous clock sources comprises a system clock.

3. A circuit in accordance with claim 1, wherein each current source is a constant current source.

4. A circuit in accordance with claim 3, wherein each constant current source comprises a current mirror comprising a first bipolar transistor whose load path is coupled between a power supply and ground through a resistor and a second bipolar transistor whose load path is coupled between a control input of the first bipolar transistor and ground and whose control input is connected to a node between the load path of the first bipolar transistor and the resistor.

5. A circuit in accordance with claim 1, the synchronous clock source comprising an external clock source.

6. A circuit in accordance with claim 1, the asynchronous clock source comprising an internal clock source.

7. A method for providing a circuit for obscuring gate switching noise, comprising:
providing a synchronous clock source;
providing an asynchronous clock source;
providing a plurality of current sources; and
receiving clock inputs from the synchronous clock source and from the asynchronous clock source by a random number generating circuit,
generating randomly changing asynchronous digital control signals by the random number generating circuit, and
feeding an output signal of the random number generating circuit into a bitstream buffer and controlling an amplitude of the plurality of current sources, wherein the plurality of current sources tap from different bit offsets in the bitstream buffer.

8. A method in accordance with claim 7, wherein the synchronous clock sources comprises a system clock.

9. A method in accordance with claim 7, wherein the synchronous clock source comprises an external clock source.

10. A method in accordance with claim 7, the asynchronous clock source comprising an internal clock source.

11. A method according to claim 7, wherein each current source of the plurality of current sources is a constant current source.

12. A method according to claim 7, wherein the method is performed within an integrated encryption device comprising an encryption encoder and where the method obscures gate switching noise of the integrated encryption device.

13. An integrated circuit, comprising:
an encryption processor; and
a circuit for obscuring gate switching noise, comprising:
a synchronous clock source;
an asynchronous clock source;
a plurality of current sources;
a random number generating circuit receiving clock inputs from the synchronous clock source and the asynchronous clock source, the random number generating circuit generating randomly changing asynchronous digital control signals, and
a bitstream buffer receiving an output signal of the random number generating circuit and being configured to control an amplitude of the plurality of current sources, wherein the plurality of current sources tap from different bit offsets in the bitstream buffer.

14. An integrated circuit in accordance with claim 13, wherein the synchronous clock sources comprises a system clock.

15. An integrated circuit in accordance with claim 13, the synchronous clock source comprising an external clock source.

16. An integrated circuit in accordance with claim 13, the asynchronous clock source comprising an internal clock source.

17. An integrated circuit in accordance with claim 13, the encryption processor comprising a code hopping encryption processor.

18. An integrated circuit in accordance with claim 13, wherein each current source of the plurality of current sources is a constant current source.

19. An integrated circuit in accordance with claim 18, wherein each constant current source comprises a current mirror comprising a first bipolar transistor whose load path is coupled between a power supply and ground through a resistor and a second bipolar transistor whose load path is coupled between a control input of the first bipolar transistor and ground and whose control input is connected to a node between the load path of the first bipolar transistor and the resistor.

20. A circuit for obscuring gate switching noise, comprising:
a synchronous clock source;
an asynchronous clock source;
at least one constant current source; and
a random number generating circuit receiving clock inputs from the synchronous clock source and the asynchronous clock source, the random number generating circuit generating randomly changing asynchronous digital control signals for controlling the current source, wherein the constant current source comprises a current mirror comprising a first bipolar transistor whose load path is coupled between a power supply and ground through a resistor and a second bipolar transistor whose load path is coupled between a control input of the first bipolar transistor and ground and whose control input is connected to a node between the load path of the first bipolar transistor and the resistor.

* * * * *